(12) United States Patent
Govind

(10) Patent No.: US 10,257,273 B2
(45) Date of Patent: Apr. 9, 2019

(54) SYSTEMS, METHODS AND DEVICES FOR RDMA READ/WRITE OPERATIONS

(71) Applicant: NetApp, Inc., Sunnyvale, CA (US)

(72) Inventor: Subin Govind, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 167 days.

(21) Appl. No.: 14/815,662

(22) Filed: Jul. 31, 2015

(65) Prior Publication Data
US 2017/0034268 A1    Feb. 2, 2017

(51) Int. Cl.
*H04L 29/08* (2006.01)
*G06F 15/173* (2006.01)

(52) U.S. Cl.
CPC .... *H04L 67/1097* (2013.01); *G06F 15/17331* (2013.01); *H04L 67/1008* (2013.01)

(58) Field of Classification Search
CPC .................................................. H04L 67/1097
USPC .......................................................... 709/212
See application file for complete search history.

(56) References Cited

U.S. PATENT DOCUMENTS

| | | |
|---|---|---|
| 5,819,292 A | 10/1998 | Hitz et al. |
| 5,990,810 A | 11/1999 | Williams |
| 6,119,205 A | 9/2000 | Wicki |
| 6,289,356 B1 | 9/2001 | Hitz et al. |
| 6,725,337 B1 | 4/2004 | Tan |
| 7,072,916 B1 | 7/2006 | Lewis et al. |
| 7,099,955 B1 | 8/2006 | Gregg |
| 7,155,460 B2 | 12/2006 | McGovern et al. |
| 7,162,486 B2 | 1/2007 | Patel et al. |

(Continued)

FOREIGN PATENT DOCUMENTS

| | | |
|---|---|---|
| CN | 1877540 A | 12/2006 |
| CN | 1293477 C | 1/2007 |

(Continued)

OTHER PUBLICATIONS

Office Action dated Jun. 29, 2017, U.S. Appl. No. 14/815,601, 12 pages.

(Continued)

*Primary Examiner* — David R Lazaro
*Assistant Examiner* — Zia Khurshid
(74) *Attorney, Agent, or Firm* — Klein, O'Neill & Singh, LLP (57) ABSTRACT

Presented herein are Remote Direct Memory Access (RDMA) networks, RDMA protocols, and methods for performing upper layer protocol (ULP) for RDMA network configurations. Methods for performing ULP RDMA include: a client central processing unit (CPU) allocating a buffer in a memory region of a client computing device; a client network interface card (NIC) creating a steering tag for the buffer; the client CPU transmitting to a local server CPU of a local server node an initiate RDMA request, the RDMA request including source and destination (SRC-DEST) information and a requested RDMA operation, the SRC-DEST information including the steering tag and a file path for a data file; a remote server NIC of a remote server node locating the data file with the file path; the remote server NIC performing the requested RDMA operation without utilizing the server's CPU; and the client and remote server NIC's completing the requested RDMA operation.

20 Claims, 7 Drawing Sheets

(56) References Cited

U.S. PATENT DOCUMENTS

| | | | |
|---|---|---|---|
| 7,203,796 B1 | 4/2007 | Muppalaneni | |
| 7,231,412 B2 | 6/2007 | Hitz et al. | |
| 7,305,581 B2 | 12/2007 | Geng | |
| 7,366,834 B2 | 4/2008 | McGovern et al. | |
| 7,590,807 B2 | 9/2009 | McGovern et al. | |
| 7,593,996 B2 | 9/2009 | Gole | |
| 7,610,348 B2 | 10/2009 | Kisley | |
| 7,624,156 B1 | 11/2009 | Hefty | |
| 7,827,201 B1 | 11/2010 | Gordon et al. | |
| 7,870,356 B1 | 1/2011 | Veeraswamy et al. | |
| 7,917,597 B1 | 3/2011 | Lentini | |
| 7,930,493 B1 | 4/2011 | McGovern et al. | |
| 8,041,987 B2 | 10/2011 | Allen | |
| 8,140,786 B2 | 3/2012 | Bunte et al. | |
| 8,233,380 B2 | 7/2012 | Subramanian | |
| 8,244,825 B2 | 8/2012 | Subramanian | |
| 8,244,826 B2 | 8/2012 | Benner | |
| 8,332,362 B2 | 12/2012 | McGovern et al. | |
| 8,352,431 B1 | 1/2013 | Protopopov et al. | |
| 8,484,164 B1 | 7/2013 | Sivakumar et al. | |
| 8,566,371 B1 | 10/2013 | Bono et al. | |
| 8,577,986 B2 | 11/2013 | Pinkerton | |
| 8,595,313 B2 | 11/2013 | Weber | |
| 8,600,949 B2 | 12/2013 | Periyagaram et al. | |
| 8,627,136 B2 | 1/2014 | Shankar | |
| 8,775,718 B2 | 7/2014 | Kanevsky | |
| 9,442,806 B1 | 9/2016 | Bardale et al. | |
| 2002/0071386 A1 | 6/2002 | Gronke | |
| 2002/0083037 A1 | 6/2002 | Lewis et al. | |
| 2002/0124137 A1 | 9/2002 | Ulrich et al. | |
| 2003/0158863 A1 | 8/2003 | Haskin et al. | |
| 2003/0191911 A1 | 10/2003 | Kleinschnitz et al. | |
| 2004/0010545 A1* | 1/2004 | Pandya | H04L 29/06 709/203 |
| 2004/0030846 A1 | 2/2004 | Armangau et al. | |
| 2005/0015459 A1 | 1/2005 | Gole | |
| 2005/0198113 A1* | 9/2005 | Mohamed | H04L 67/1097 709/203 |
| 2005/0246397 A1 | 11/2005 | Edwards et al. | |
| 2006/0112151 A1 | 5/2006 | Manley et al. | |
| 2006/0123211 A1 | 6/2006 | Derk et al. | |
| 2006/0206536 A1 | 9/2006 | Sawdon et al. | |
| 2006/0236063 A1 | 10/2006 | Hausauer | |
| 2006/0248088 A1 | 11/2006 | Kazar | |
| 2007/0038821 A1 | 2/2007 | Peay | |
| 2007/0078940 A1 | 4/2007 | Fineberg | |
| 2007/0162641 A1 | 7/2007 | Oztaskin | |
| 2007/0208820 A1 | 9/2007 | Makhervaks | |
| 2007/0282967 A1 | 12/2007 | Fineberg | |
| 2007/0288247 A1 | 12/2007 | MacKay | |
| 2007/0288921 A1 | 12/2007 | King | |
| 2007/0294321 A1 | 12/2007 | Midgley et al. | |
| 2007/0300008 A1 | 12/2007 | Rogers | |
| 2008/0126509 A1 | 5/2008 | Subramanian | |
| 2008/0148281 A1 | 6/2008 | Magro | |
| 2008/0183882 A1 | 7/2008 | Flynn | |
| 2008/0294696 A1 | 11/2008 | Frandzel | |
| 2009/0013129 A1 | 1/2009 | Bondurant | |
| 2009/0204969 A1 | 8/2009 | Abadi et al. | |
| 2009/0268903 A1 | 10/2009 | Bojinov et al. | |
| 2009/0276514 A1 | 11/2009 | Subramanian | |
| 2009/0319772 A1 | 12/2009 | Singh et al. | |
| 2010/0077161 A1 | 3/2010 | Stoakes et al. | |
| 2010/0131466 A1 | 5/2010 | Chen | |
| 2010/0241614 A1 | 9/2010 | Shaull et al. | |
| 2011/0099351 A1 | 4/2011 | Condict et al. | |
| 2011/0185149 A1 | 7/2011 | Gruhl et al. | |
| 2011/0231375 A1 | 9/2011 | Cannon et al. | |
| 2012/0042202 A1 | 2/2012 | Wenzel | |
| 2012/0166401 A1 | 6/2012 | Li et al. | |
| 2012/0259810 A1 | 10/2012 | Kopylovitz et al. | |
| 2014/0122892 A1 | 5/2014 | Corbett | |
| 2014/0344539 A1 | 11/2014 | Gordon et al. | |
| 2016/0092137 A1 | 3/2016 | Doerk et al. | |

FOREIGN PATENT DOCUMENTS

| | | |
|---|---|---|
| CN | 101183383 A | 5/2008 |
| CN | 102012852 A | 4/2011 |
| WO | WO-2008021528 A2 | 2/2008 |

OTHER PUBLICATIONS

Notice of Allowance on co-pending U.S. Appl. No. 14/815,601 dated Mar. 15, 2018.

International Preliminary Report on Patentability for Application No. PCT/US2012/070962 dated Jun. 24, 2014, 6 pages.

International Search Report and Written Opinion for Application No. PCT/US2012/070962 dated Mar. 19, 2013, 9 pages.

Supplementary European Search Report for Application No. EP12859970 dated Jul. 28, 2016, 7 pages.

Bill von Hagen, "Journaling Filesystems for Linux", May 17, 2002, Pearson Education, Inform it, p. 4 http://www.informit.com/articles/article.aspx?p=26885&seqNum=5.

Non-Final Office Action on related U.S. Appl. No. 13/331,978 dated Apr. 23, 2013.

Final Office Action on related U.S. Appl. No. 13/331,978 dated Oct. 29, 2013.

Non-Final Office Action on related U.S. Appl. No. 13/331,978 dated Mar. 13, 2014.

Final Office Action on related U.S. Appl. No. 13/331,978 dated Jul. 3, 2014.

Non-Final Office Action on related U.S. Appl. No. 13/331,978 dated Jun. 2, 2015.

Final Office Action on related U.S. Appl. No. 13/331,978 dated Aug. 28, 2015.

Non-Final Office Action on related U.S. Appl. No. 13/331,978 dated Oct. 29, 2015.

Final Office Action on related U.S. Appl. No. 13/331,978 dated Jan. 11, 2016.

Non-Final Office Action on related U.S. Appl. No. 13/331,978 dated Jun. 8, 2016.

Non-Final Office Action on related U.S. Appl. No. 14/848,482 dated Nov. 15, 2016.

Notice of Allowance on related U.S. Appl. No. 14/848,482 dated Mar. 21, 2017.

Non-Final Office Action on related U.S. Appl. No. 14/815,601 dated Jun. 29, 2017.

Final Office Action on related U.S. Appl. No. 14/815,601 dated Nov. 27, 2017.

International Search Report and Written Opinion for Application No. PCT/US2018/018783 dated May 4, 2018, 12 pages.

\* cited by examiner

SYSTEMS, METHODS AND DEVICES FOR RDMA READ/WRITE OPERATIONS

TECHNICAL FIELD

The present disclosure relates generally to computer networks and mass data storage systems. More particularly, aspects of this disclosure relate to computer network configurations, Remote Direct Memory Access (RDMA) protocols, and methods for RDMA read-write operations for scale-out storage clusters.

BACKGROUND

Mass data storage systems are used for many purposes, including storing user and system data for data processing, backup and transmission applications. A typical mass storage system includes numerous computer disk drives that cooperatively store data, for example, as a single logically contiguous storage space, often referred to as a volume or a logical unit. One or more such volumes/logical units may be configured in a storage system. The storage system therefore performs much like that of a single computer disk drive when viewed by a host computer system. For example, the host computer system can access data of the storage system much like it would access data of a single internal disk drive, in essence, without regard to the substantially transparent underlying control of the storage system.

A mass storage system may include one or more storage modules with each individual storage module comprising multiple disk drives coupled to one or more storage controllers. In one common configuration, a storage module may be coupled through its storage controller(s) directly to a host system as a standalone storage module. Typical storage controllers include significant cache memory capacity to improve performance of the I/O operation. Write requests may be completed when the supplied data is written to the higher speed cache memory. At some later point, the data in cache memory may be flushed or posted to the persistent storage of the storage modules. Also, read requests may often be satisfied by accessing data already resident in the higher speed cache memory of the storage controller.

In a standalone configuration, it is common to enhance reliability and performance by providing a redundant pair of storage controllers. The redundant pair of controllers enhances reliability in that an inactive storage controller may assume control when an active controller is sensed to have failed in some manner. Redundant pairs of storage controllers may also enhance performance of the standalone storage system in that both storage controllers may be active each acting as backup for the other while both simultaneously processing different I/O requests or different portions of an I/O request. In such a configuration with redundant storage controllers, the storage controllers typically exchange information to maintain coherency of data between the cache memories resident in each controller. Some storage systems use the communication path between the controllers and the storage modules for the additional cache coherency information exchanges.

In another standard system configuration, a storage module may be part of a larger storage network or "cluster." For a cluster-type architecture, multiple storage modules and corresponding storage controllers are typically coupled through a switched network communication medium, known as a "fabric," to one or more host systems. This form of storage module system is often referred to as a Storage Area Network (SAN) architecture and the switching fabric is, concomitantly, referred to as a SAN switching fabric. In such a clustered configuration, it is common that all of the storage controllers exchange coherency information and other information for load balancing of I/O request processing and other control information. Such control information may be exchanged over the same network fabric that couples the storage controllers to the host systems (e.g., a "front end" connection) or over another fabric that couples the storage controllers to the storage modules (e.g., a "back-end" connection).

RDMA technology, also referred to as "RDMA protocol," provides a useful method for reducing processor workload in the transmission of data in network-related processing. In general, RDMA technology reduces central processing unit (CPU) workload in the transmission and reception of data across a network between two computer nodes by transferring data directly from memory of a local computer node to memory of a remote computer node without continuously involving the CPU of the remote node. RDMA technology is typically used by, for example, commercial data centers and mass data storage systems that support high performance computing services. It is often required that specialized hardware be provided on both the client (remote computer node) and the server (local computer node) to implement the RDMA protocol. Network interface card (NIC) hardware fabricated to implement RDMA technology, for example, can process operations that were previously performed by a CPU.

An RDMA write operation transfers data from the memory of a local computer node to the memory of a remote computer node. An RDMA read operation, in contrast, requests transfer of data from the memory of a remote computer node to the memory of a local computer node. Each RDMA connection typically uses a pair of memory data structures, a send queue, and a receive queue, that allow the computer node to post work requests to the RDMA capable hardware. There is also a completion queue that stores completion notifications for the submitted work requests. A send queue, a receive queue, and a completion queue are oftentimes collectively referred to as a queue structure (QS). Once the RDMA connection is established, a computer node can post a request in one of the queues the send or receive queue. Each queue stores a request from the time it is posted by the node until the time it is processed. An interconnect adapter on the node is then notified by an interconnect driver on the same node that the request is posted; it reads the request in the queue and does the actual data transfer over a network. After receipt of the requested data is completed, the interconnect adapter at the computer node that receives the data writes data directly to destination memory at the second computer node. Then a completion result is sent back to the first computer node. The interconnect adapter at the first computer node posts the result to its completion queue.

RDMA upper layer protocol (ULP), such as server message block direct (SMBD) protocols and like application-layer network protocols, typically uses a model in which the initiator (client) requests an RDMA operation after registering memory. The host server is then expected to complete the operation using RDMA. Clients connecting to a scale-out file server may oftentimes choose to connect to any node in a cluster depending on the load balancing model. While this option aids "scale out" of the system—e.g., the ability to incrementally increase storage capacity (storage modules) of the system—there is a performance penalty associated with having to go over the cluster interconnect. Typically, requests that go to a remote node can result in higher client-perceived latency. There is therefore a need for RDMA protocol that reduces latency while minimizing utilization of the cluster interconnect.

The present disclosure is susceptible to various modifications and alternative forms, and some representative embodiments have been shown by way of example in the drawings and will be described in detail herein. It should be understood, however, that the aspects and features of this disclosure are not limited to the particular forms illustrated in the drawings. Rather, the disclosure is to cover all modifications equivalents and alternatives falling within the scope of the disclosure as defined by the appended claims.

DETAILED DESCRIPTION OF ILLUSTRATED EXAMPLES

This disclosure is susceptible of embodiment in many different forms. There are shown in the drawings, and will herein be described in detail, representative embodiments with the understanding that the present disclosure is to be considered as an exemplification of the principles of the present disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed or logically prohibited: the singular includes the plural and vice versa; and the words "including" or "comprising" or "having" means "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Aspects of this disclosure are directed to upper layer protocol (ULP) for Remote Direct Memory Access (RDMA), such as Server Message Block Direct (SMBD) protocol, Internet Small Computer System Interface (iSCSI) protocol, Network File System (NFS) protocol, or any other protocol utilizing RDMA, where clients initiate RDMA operations, for example, after registering memory, and servers execute the operation using RDMA. In the case of a scale out server, the server can terminate the operation on the client directly from the node that stores the data. This will prevent an extra hop over the cluster interconnect with the actual data, which helps to reduce latency and the utilization of the cluster interconnect. By way of example, a read/write request from a client can be completed without "hopping" over a network, thereby eliminating inter-cluster network latency and reducing processing workload. In so doing, requests run significantly faster and CPU usage is concomitantly reduced over conventional methods.

Also presented herein are RDMA verbs that define an application programming interface (API) that can be used by consumers of RDMA and provide for the concept of a "protection domain." A protection domain (PD) is a mechanism that is used by the verbs layer to associate a memory region to one or more Queue Pairs (QP). Each protection domain has corresponding identification information (ID). An RDMA network interface card (RNIC) allows an RDMA request on a QP to write to a memory region (MR) if the QP and the MR both have the same PD ID. A PD is a logical grouping of QPs such that a memory location registered in that PD is accessible by all the connections in the PD. So, if a client registers a location of memory and informs a remote node about the memory over a QP, every connection QP in that PD can access that memory location. The client can then connect to all nodes on the same cluster so that it has a QP per node. The server can therefore write directly to the client's memory from the node that stores the selected data.

When a client connects to a scale-out server, it may choose to setup a queue pair to every node on the cluster using the same RNIC with the same PD ID. A read request that is sent by the client will result in an RDMA write of the data from the correct server node directly to the client. This will avoid sending the data over the cluster interconnect which, in turn, will save interconnect bandwidth and reduce client perceived latency. The client request to perform RDMA is typically small in size and contains minimal data, such as a set of steering tags. The response is typically much larger in size and contains the data that is being read or written. So, although the request still goes over the cluster interconnect, it is small in size and results in lesser overhead than sending the actual data. A steering tag is a cookie that represents a piece of memory. The client processor asks the client network interface card to register a piece of memory and returns a steering tag that can be passed over the network to the host. The host can then direct the host network interface card to use the steering tag to read/write to the memory in question remotely.

Figure 1:
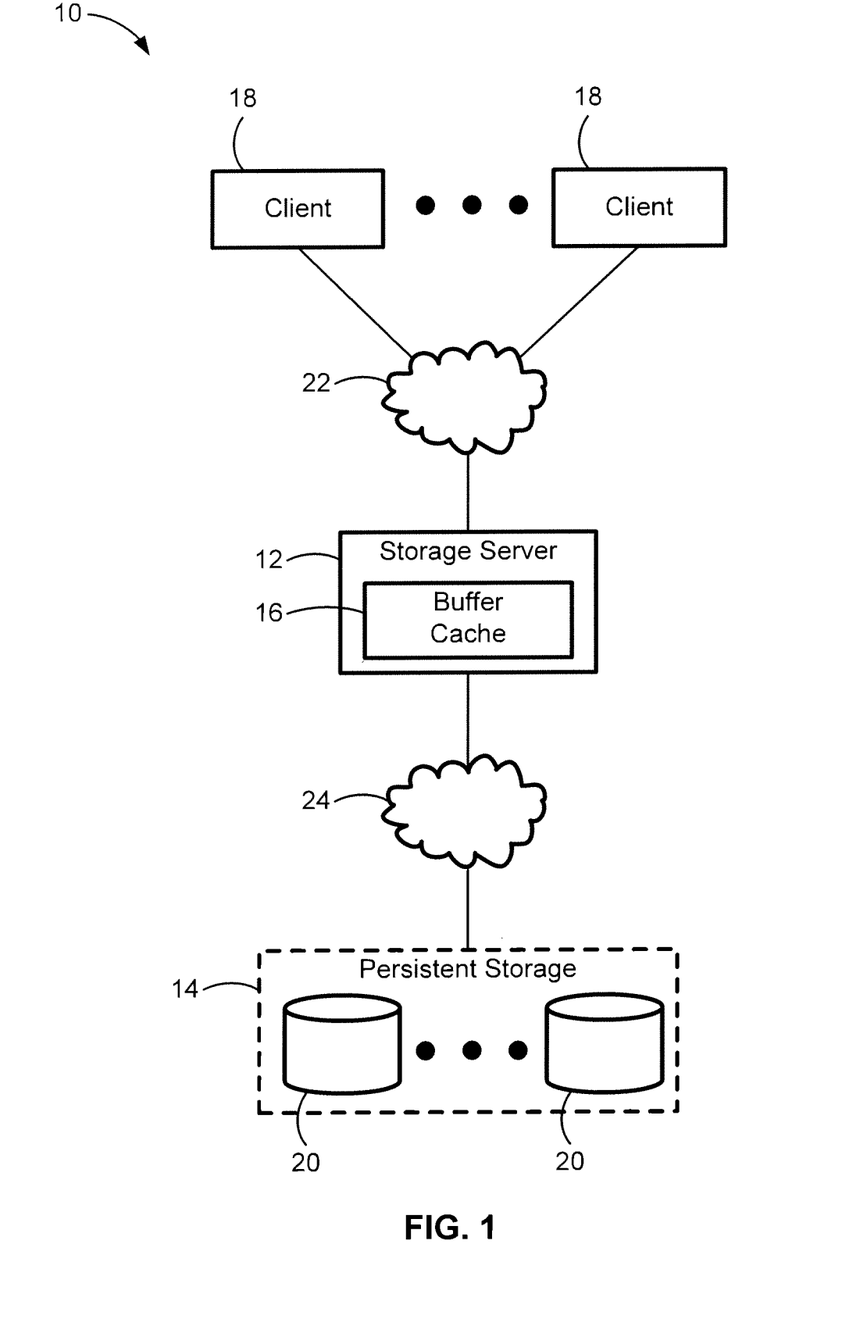
FIG. 1 is a schematic diagram illustrating a representative networked mass data storage system in accordance with aspects of the present disclosure.

Referring now to the drawings, wherein like reference numerals refer to like features throughout the several views, there is shown in FIG. 1 a representative mass data storage system, designated generally at 10, for performing Remote Direct Memory Access (RDMA) operations in accordance with aspects of the present disclosure. The system 10 includes, but is certainly not limited to, one or more host storage servers 12 communicatively coupled to one or more data storage modules 14, each of which includes, for example, multiple non-volatile mass storage devices 20. Also communicatively coupled to the host storage server(s) 12 through a network interconnect 22 are one or more clients 18. The network interconnect 22 may be, for example, a local area network (LAN), a wireless local area network (WLAN), a wide area network (WAN), a metropolitan area network (MAN), a global area network, a distributed computer system, such as the Internet, a Fibre Channel fabric, or any combination of such interconnects. Each of the clients 18 may take on various forms including, as some non-limiting examples, a server-class computer, a networked workstation, a personal computer (PC), a handheld computing device, and the like. It should be readily understood that the system 10 illustrated in FIG. 1 is merely provided as an exemplary application by which the various aspects and features of this disclosure can be applied. Moreover, only selected components of the system 10 have been shown and will be described in additional detail hereinbelow. Nevertheless, the systems and devices discussed herein can include numerous additional and alternative features, and other well-known peripheral components, for example, for carrying out the various methods and functions disclosed herein.

Each storage server 12 is operable, in whole or in part, to manage storage of data in at least one of the one or more storage modules 14. A storage server 12 receives and responds to various RDMA read requests and/or RDMA write requests from one or more of the clients 18 directed to data stored in, or to be stored in, the storage module(s) 14. A storage server 12 communicates with a storage module 14 over a network interconnect 24. Each server can be implemented on one or more server class computers, which can be subcomponents of a computer hardware server system, with sufficient memory, data storage, and processing power and, in some embodiments, the capabilities to run a server class operating system (e.g., GNU/Linux, SUN Solaris, Microsoft Windows OS, etc.). The servers can each be part of a logical group of one or more servers, such as a server farm or server network.

As is typical in large-scale systems, the application software can be implemented in components, with different components running on different server computers, on the same server, or any logical combination thereof. Interconnect 24 may support any of various types of communication protocols, such as Ethernet, iWarp, Fibre Channel Virtual Interface (FCVI), InfiniBand. Peripheral Component Interconnect express (PCIe), and the like. Like interconnect 22, interconnect 24 may comprise a LAN, a WLAN, a WAN, a MAN, a global area network, a distributed computer system, a Fibre Channel fabric, or any combination thereof. Interconnects 22 and 24 can each be a wired or a wireless network, or a combination of wired and wireless technology. Communication can take place through any now-known or hereinafter developed media, such as telephone lines (e.g., Dial-Up), local area network (LAN) or wide area network (WAN) links (e.g., Ethernet, T(X) lines, X.25, etc.), broadband connections (e.g., Integrated Service Data Network (ISDN), Frame Relay, etc.), wireless links (e.g., infrared, Bluetooth®, WiFi or WLAN), cellular networks, and so on.

Mass storage devices 20 of each storage module 14 can take on various non-known or hereinafter developed forms, including non-volatile solid-state memory, such as flash memory or other read-only memory (ROM); alternatively, a storage module may contain conventional electronic, magnetic or optical disks or tape drives. These mass storage devices 20 can be organized as one or more Redundant Array of Inexpensive/Independent Disk/Device (RAID) groups, in which case the storage server(s) 12 accesses the storage module(s) 14 using one or more RAID algorithms. The illustrated storage server 12 also includes an optional internal buffer cache 16, which can be implemented as DRAM, for example, or, the buffer cache 16 can be implemented as non-volatile solid-state memory, including flash memory.

The storage server(s) 12 may provide file-level data access service to clients 18, such as commonly done by a storage server in a network attached storage (NAS) environment (i.e., a "filer"), or block-level data access service such as commonly done by a storage server in a storage area network (SAN) environment. A storage server 12 may be operable to provide both file-level data access service and block-level data access service, for some network configurations. Further, although the storage server 12 is illustrated as a single unit in FIG. 1, the storage server 12 can have a distributed architecture. For example, the storage server 12 can include a physically separate network element and data element that communicate over an interconnect, as will be described in further detail hereinbelow.

Figure 2:
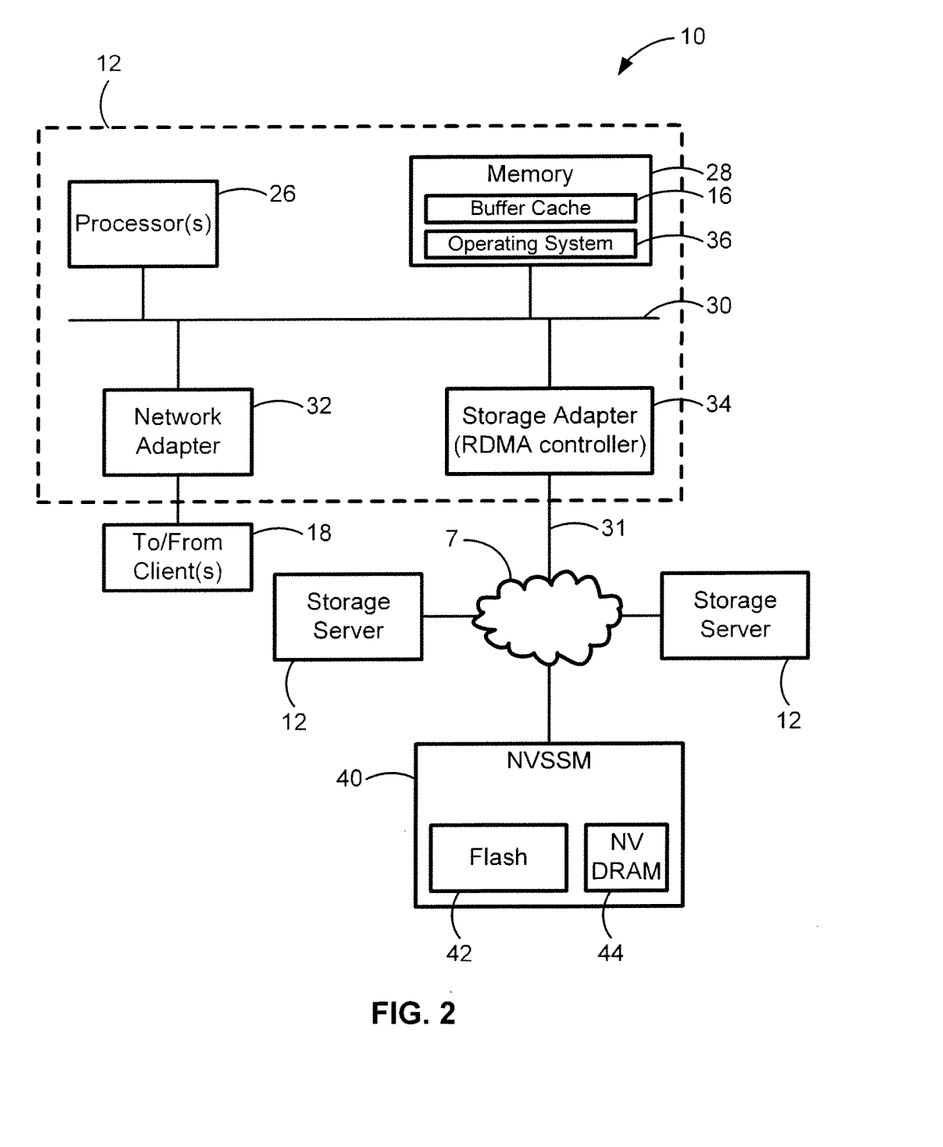
FIG. 2 is a schematic diagram illustrating a representative architecture of a storage server communicatively coupled to a client computing device and a data storage module according to aspects of the present disclosure.

FIG. 2 is a high-level block diagram showing an example architecture of the storage server 12 and an example architecture of an optional storage device configuration 40. The storage server 12 includes one or more processors 26 (e.g., CPU, distributed processors, master processors, slave processors, parallel processors, etc.) and one or more memory devices 28, which can comprise a volatile memory (e.g., a random-access memory (RAM) or multiple RAM) and a non-volatile memory (e.g., an EEPROM), coupled via interconnect 30. As shown in FIG. 2, the interconnect 30 is an abstraction that represents any one or more separate physical buses, point-to-point connections, or both, connected by appropriate bridges, adapters, or controllers, for example. The interconnect 30, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, an Institute of Electrical and Electronics Engineers (IEEE) standard 1394 bus (sometimes referred to as "Firewire"), or any combination of such interconnects.

Storage server processor(s) 26 include one or more central processing units (CPUs) operable to control the overall operation of the storage server 12. In at least some embodiments, the processor(s) 26 accomplishes this by executing software or firmware stored in memory 28. The processor(s) 26 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. Memory 28 is, or includes, the main memory of the storage server 12. Memory 28 represents any form of random access memory (RAM), read-only memory (ROM), flash memory, or the like, or a combination of such devices. In use, the memory 28 may contain, among other things, at least a portion of the storage operating system 36 of the storage server 12. The memory 28 can also include the buffer cache 16 of the storage server 12, as shown.

Also connected to the processor(s) 26 through storage server interconnect 30 are a network adapter 32 and a storage adapter 34. The network adapter 32 provides the storage server 12 with the ability to communicate with remote devices, such as clients 18, over network 22 and may be, for example, an Ethernet. Fibre Channel, ATM, or Infiniband adapter. By comparison, the storage adapter 34 allows the storage server 12 to access one or more storage modules 14, which may be implemented as a non-volatile solid-state memory (NVSSM) subsystem 40. For network configurations wherein a storage module(s) 14 is implemented using more traditional mass storage, such as magnetic disks, the storage adapter 34 may be, for example, a Fibre Channel adapter or a SCSI adapter. In certain embodiments, the network adapter 32 and the storage adapter 34 may be the same physical device. For some implementations, storage adapter 34 is or includes an RDMA controller and, thus, may henceforth be referred to as "host RDMA controller" 34.

The RDMA techniques described herein can be used to transfer data between memory 28 within the storage server 12 (e.g., buffer cache 16) and the data storage modules 14, such as NVSSM subsystem 40. Host RDMA controller 34 includes a memory map of all of the memory in each storage module 14. In certain embodiments, the memory in the NVSSM subsystem 40 includes flash memory 42 as well as some form of non-volatile DRAM 44 (e.g., battery backed DRAM). Non-volatile DRAM 44 is used for storing filesystem metadata associated with data stored in the flash memory 42, to avoid the need to erase flash blocks due to updates of such frequently updated metadata. File system metadata can include, for example, a tree structure of objects, such as files and directories, wherein the metadata of each of these objects recursively has the metadata of the file system as if it were rooted at that object. In addition, file system metadata can include the names, sizes, ownership, access privileges, etc. for those objects.

Figure 3:
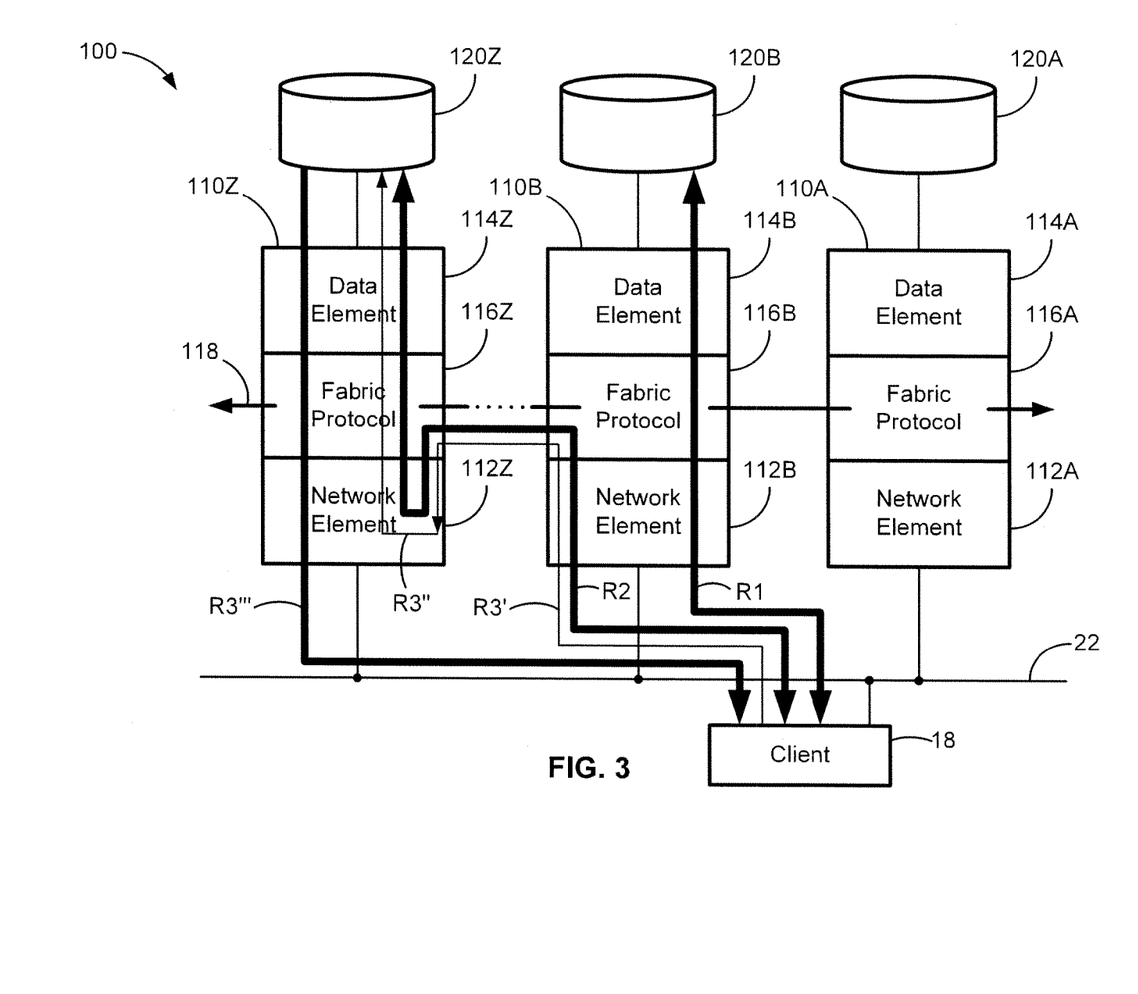
FIG. 3 is a schematic diagram illustrating a representative cluster-type storage module architecture in accordance with aspects of the present disclosure.

FIG. 3 presents a representative cluster-type storage module architecture, designated generally as 100, with a plurality of nodes 110A, 110B . . . 110Z configured to provide storage services relating to the organization of information on storage devices. Each node 110A, 110B . . . 110Z comprises various functional components that cooperate to provide a distributed storage system architecture of the cluster 100. By way of non-limiting example, each node can be generally organized as a respective network element 112A, 112B . . . 112Z, and a respective data element 114A. 114B . . . 114Z. A network element enables a node to connect to clients 12 over a computer network 22, while a data element connects a node to one or more storage devices, such as disks of a disk array 120A, 120B . . . 120Z, which may be similar in form and function to mass storage devices 20 of FIG. 1 or storage device configuration 40 of FIG. 2. The nodes 110A, 110B . . . 110Z are interconnected by a cluster switching fabric 118 which, in the illustrative embodiment, may be embodied as a Gigabit Ethernet switch. While there is shown an equal number of network elements and data elements in the illustrative cluster 100, there may be differing numbers of network elements and/or data elements in accordance with various embodiments of the present disclosure. For example, there may be a plurality of network elements and/or data elements interconnected in a cluster configuration 100 that does not reflect a one-to-one correspondence between network element and data elements. An example of a distributed file system architecture is described in U.S. Pat. No. 6,671,773, to Michael L. Kazar et al., which is incorporated herein by reference in its entirety and for all purposes.

Communication between a network element and a data element of a node in FIG. 3 is illustratively effected through the use of message passing between the blades. In the case of remote communication between network elements and data elements of different nodes, such message passing occurs over the cluster switching fabric 118. A message-passing mechanism provided by the storage operating system to transfer information between blades (processes) is the Inter Process Communication (IPC) mechanism, for example. The protocol used with the IPC mechanism is illustratively a generic file and/or block-based "agnostic" cluster fabric (CF) protocol that comprises a collection of methods/functions constituting a CF application programming interface (API), such as a spin-agnostic protocol 116A, 116B . . . 116Z.

In accordance with aspects of the disclosed concepts, clients 18 interact with one or more of nodes 110A, 110B . . . 110Z of cluster 100 in accordance with a client/server model of information delivery. As a first example, which is represented in FIG. 3 by dual-headed arrow R1, a client may request the services of a local node, e.g., to perform an RDMA read/write operation for data stored/to be stored on a local disk array. In this example, a connection is opened by the client 18 with a local node 110B; an RDMA operation request (e.g., a read request) is transmitted by the client 18 to the local network element 112B over network 22; the requested data file is read by the local data element 114B from the corresponding disk or disks of disk array 120B; the data file is transmitted from the local server RNIC to the client RNIC; and, the client RNIC writes the data file to client memory.

In a second example, which is represented in FIG. 3 by dual-headed arrow R2, a client may request the services of a remote node to perform an RDMA read/write operation for data stored/to be stored on a remote disk array. In this example, a connection is opened by the client 18 with a local node 110B: an RDMA operation request (e.g., a read request) is transmitted by the client 18 over network 22, through local node 110B and over cluster switching fabric 118 to remote network element 112Z; the requested data file is read by the remote data element 114Z from the corresponding disk or disks of disk array 120Z; the data file is transmitted from the local server RNIC to the client RNIC; and, the client RNIC writes the data file to client memory.

According to a third example, which is represented in FIG. 3 by arrows R3', R3" and a client may request the services of a remote node to perform an RDMA read/write operation for data stored/to be stored on a remote disk array without an extra hop over the cluster interconnect with the actual data, as required in the example R2. In the third example, a connection is opened by the client 18 with the local node 110B and the remote node 110Z (and potentially any or all other nodes in the cluster); as indicated by arrow R3', an RDMA operation request (e.g., a read request) is transmitted by the client 18 over network 22 to local network element 112B and contemporaneously routed through cluster switching fabric 118 to remote network element 112Z; as indicated by arrow R3", remote network element 112Z communicates with remote data element 114Z through fabric protocol 116Z to read the requested data file from the corresponding disk or disks of disk array 120Z; as indicated by arrow R3", the data file is subsequently transmitted from the remote server NIC to the client NIC; and, the client NIC writes the data file to memory. This same protocol may be implemented for an RDMA write operation to a remote server, wherein the initial RDMA operation request is routed through a local node, but the actual RDMA operation is carried out directly between the RDMA network interface cards of the client and remote node (as suggested by arrows R3' through R3'").

Figure 4A:
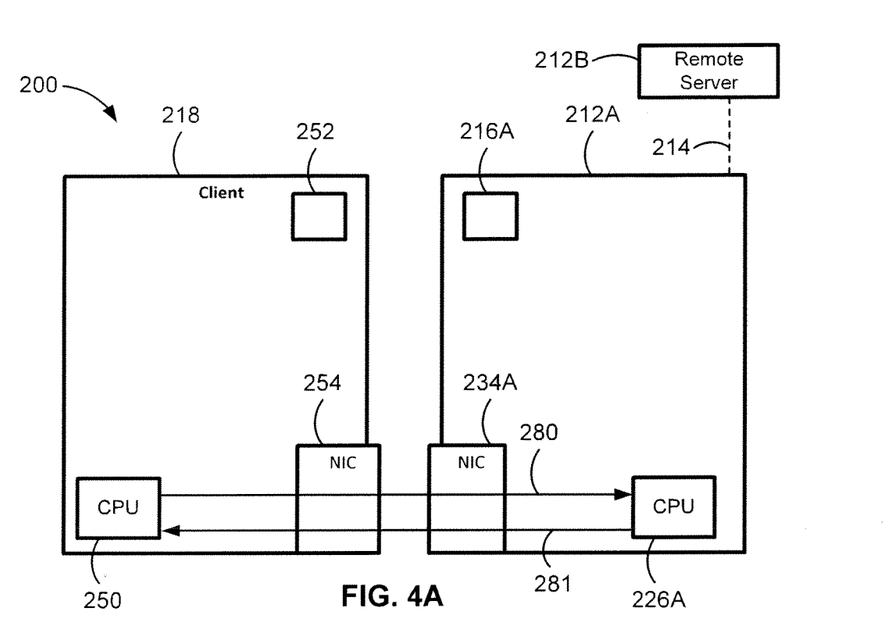
FIGS. 4A through 4C illustrate a representative Server Message Block Direct (SMBD) Remote Direct Memory Access (RDMA) read operation in accordance with aspects of the present disclosure.
Figure 4B:
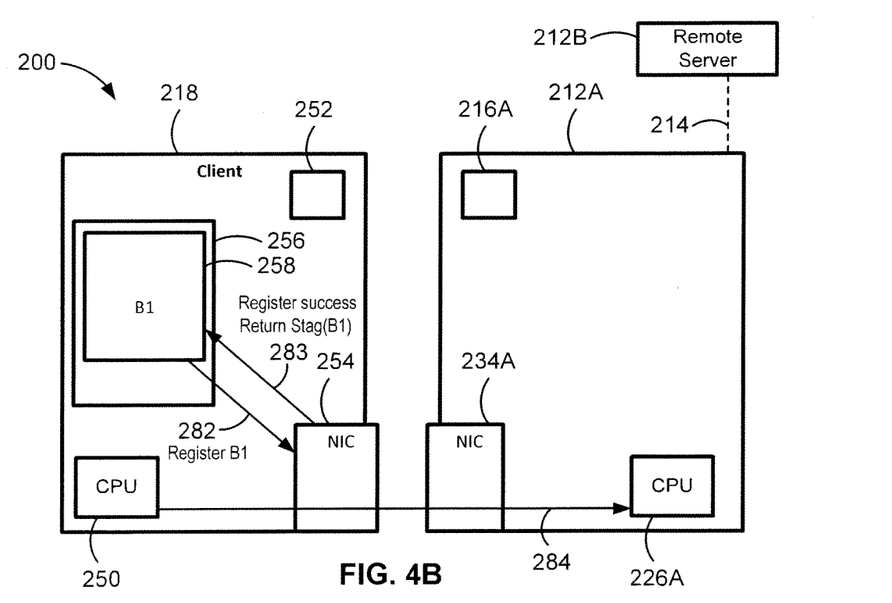
Figure 4C:
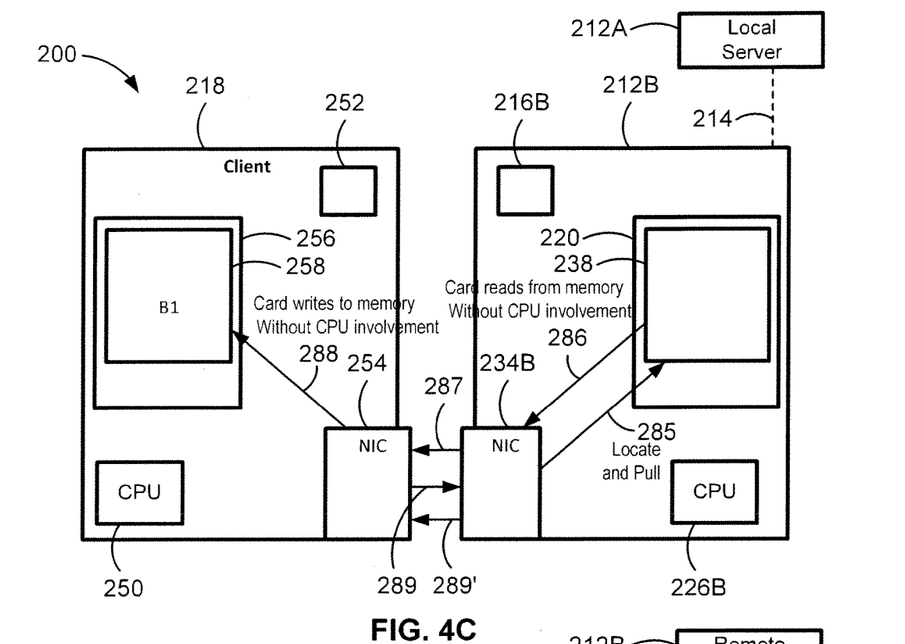

FIGS. 4A through 4C sequentially illustrate a representative Server Message Block Direct (SMBD) Remote Direct Memory Access (RDMA) read operation in accordance with aspects of the present disclosure. Likewise, FIGS. 5A through 5C sequentially illustrate a representative SMBD RDMA write operation in accordance with aspects of the present disclosure. FIGS. 4A-4C and FIGS. 5A-5C can each be representative of an algorithm or work-flow process wherein each enumerated operation or step can correspond to instructions that can be stored, for example, in one or more memory devices (e.g., local main memory 216A remote main memory 216B, client main memory 252, etc.), and executed, for example, by one or more processors (e.g., local server CPU 226A, remote server CPU 226B, client CPU 250, etc.) or other resident hardware (e.g., local server NIC 234A, remote server NIC 234B, client NIC 254, etc.) to perform any or all of the above or below described functions associated with the disclosed concepts. In this regard, FIGS. 4A-4C and FIGS. 5A-5C are more specific implementations of the third example of FIG. 3.

As indicated above, the client 218 of FIG. 4A is initiating an RDMA read operation to transfer a data file 238, with a corresponding file name File F1, file type MP4 and file path STAG_RKEY, from memory 220 of a remote server node 212B (e.g., read from disk of data storage module to main memory) to a memory region 256 (FIG. 4B) of local computer node 218. To initiate the RDMA read operation, the client CPU 250 of client computing device 218 transmits, and a local server CPU 226A of local server node 212A receives, an OPEN CONNECTION request 280. The OPEN CONNECTION request 280 is contemporaneously transmitted to any or all other nodes in the cluster, including at least remote server node 212B. Responsive to the received OPEN CONNECTION request 280 and a successful connection, each server node transmits (e.g., via the CPU of each node), and the client CPU 250 of client computing device 218 receives, a connection OPEN SUCCESS indicator 281 to notify that the connection is complete. A connection between a client computing device and a host server system can be created, for example, with an RDMA verbs layer. Creating a connection can involve creating a queue pair (QP) and a protection domain (PD). The RDMA verbs layer uses the protection domain (PD) to associate the memory region for the buffer of the client computing device to one or more queue pairs (QP). A PD is generally created for every set of QP's that needs to share memory STAGs. The QP is a means of allowing an RDMA consumer (SMBD in this case) to assign work to the local network interface card for completion.

Once the nodes are connected, the client CPU 250 allocates an empty buffer 258 with a buffer address within a memory region 256 of the client computing device 218, as seen in FIG. 4B. The client allocates said buffer to hold data to be read from the host, and then posts a job on the QP to register the buffer. By way of example, client CPU 250 submits to the client NIC 254 a REGISTER B1 282 registration request to register the buffer address and return a corresponding cookie. Client network interface card 254 responds in FIG. 4B by creating a steering tag for the allocated buffer and returning a REGISTRATION SUCCESS 283 with the requested steering tag STAG(B1). A steering tag is a type of cookie (e.g., a 32 bit number) that represents a section of memory; the client NIC registers the memory section and returns a steering tag that can be passed over the network to a node CPU. The steering tag created by the client NIC 254 contains information relating to the location of the buffer in memory of the client's device. The node CPU can then direct the node NIC to use the steering tag to read/write data from/to the memory in question. A steering tag can be in the form of an LKEY STAG and an RKEY STAG, for example. When a request is received by an RNIC from a remote machine to access local memory, the request refers to the local memory using a steering tag (e.g., RKEY). When a node CPU talks to a local NIC about a local buffer for some operation, it also refers to the buffer using a steering tag (e.g., LKEY).

Client 218 uses the STAG received from the client NIC 254, for example, as data in an untagged buffer message to tell the servers 212A and 212B about the buffer 258. In at least some embodiments. RDMA SMBD mandates that the client initiate transfer for the tagged buffer case. For instance, once the requested steering tag is generated by the client NIC 254, client CPU 250 transmits an initiate RDMA operation request, represented in FIG. 4B as READ REQUEST 284, across network to local server CPU 226A of the local server node 212A and across cluster switching fabric 214 to remote server CPU 226B of the remote server node 212B (FIG. 4C). In general, the RDMA operation request includes source (SRC) and destination (DEST) information and an RDMA operation a read request to be performed by the remote server node. By way of example, the SRC-DEST information includes the buffer steering tag and a file path for the requested data file 238 stored in memory 220 of remote node 212B (FIG. 4C). The SRC-DEST information may optionally include other relevant information, such as a file name and a file type for the requested data file. In the illustrated example, the source SRC is the buffer within system memory 220 that contains the requested file 238, whereas the destination DEST in the request message is the STAG that corresponds to the buffer that the client allocated and registered with client NIC 254. Generally speaking, a file transfer protocol such as, for example, SMB3 (CIFS) protocol, can open the requested file using a Send/Receive message on top of SMBD. Once the file is open, SMB3 refers to it via its FID. The contents of the file are read into memory by the server and referred to by a local stag when talking to the card.

When the READ REQUEST 284 is received, remote server CPU 226B pulls the buffer with the requested data, which may require reading and loading a buffer from disk, and registers this buffer with the remote server NIC 234B by placing a corresponding work request on its QP. Server 212B places another work request on its QP with the STAG for the buffer with the requested data and the STAG from the client. The work request tells the server NIC to write the local buffer to the remote buffer. With reference to FIG. 4C, for example, remote server NIC 234B will LOCATE AND PULL 285 the requested data file from memory 220 and perform the requested RDMA operation without utilizing the remote server CPU 226B. Per the latter, server NIC 234B concomitantly READS FROM MEMORY 286 File F1.mp4 from memory 220 without utilizing server CPU 226B. The RDMA operation is then completed by the client NIC 254 and the server NIC 234B without utilizing client or server processors. That is, remote server NIC 234B transmits the requested data file 238 to the client NIC 254 at 287, and the client NIC 254 concomitantly WRITES TO MEMORY 288 the data file to the allocated buffer 258 without utilizing client CPU 250.

Upon completing the requested RDMA operation, the remote server NIC 234B transmits to the client CPU 250 a completion success message as an untagged buffer. By way of example, once the transfer of data at 287 and memory write 288 is complete, the NIC 254 communicates to the server side SMBD on CPU 226B that the write is done at 289. Server SMBD creates a message indicating success, e.g., as a reply to the client's READ REQUEST 284 and directs remote server NIC 234B to send this message as an untagged buffer, as indicated at 289'. Client CPU 250 receives this completion success message as confirmation that buffer 258 corresponding to STAG(B1) now contains the valid data. Conventional RDMA does not mandate which node should initiate RDMA ops and which node should perform the RDMA op. SMBD RDMA, in contrast, mandates that the client initiate the RDMA operation and the server performs the RDMA operation. By way of non-limiting example, the client always tells the server what RDMA op to perform, and the client always registers memory and directs the server to perform an operation with that memory; the server never registers memory for write via an STAG to the client.

Figure 5A:
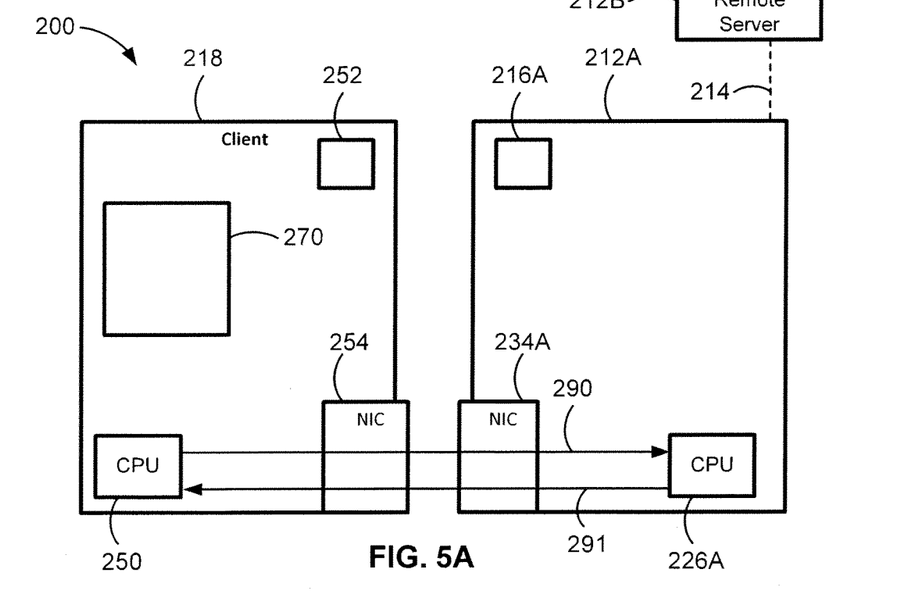
FIGS. 5A through 5C illustrate a representative SMBD RDMA write operation in accordance with aspects of the present disclosure.
Figure 5B:
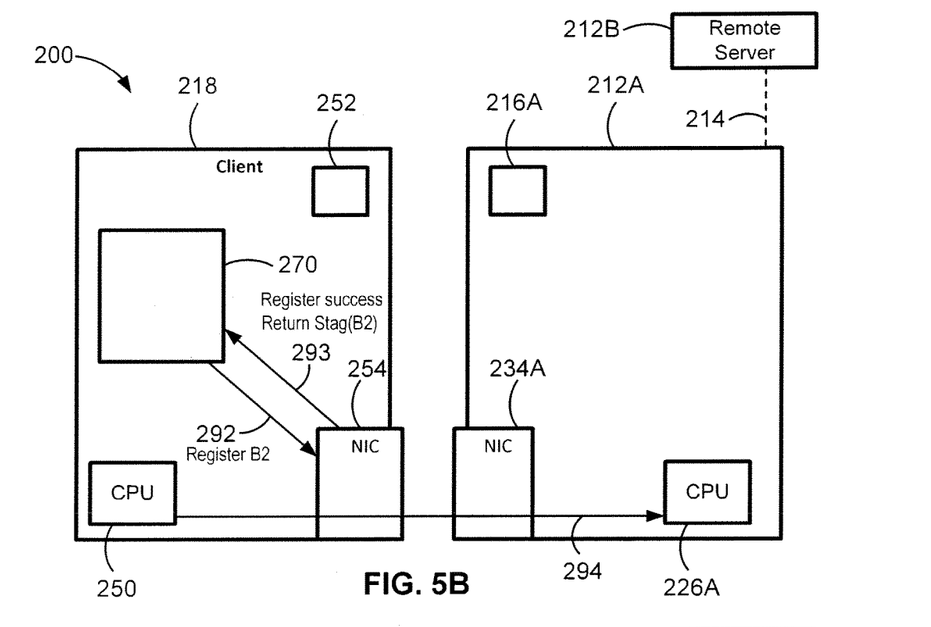
Figure 5C:
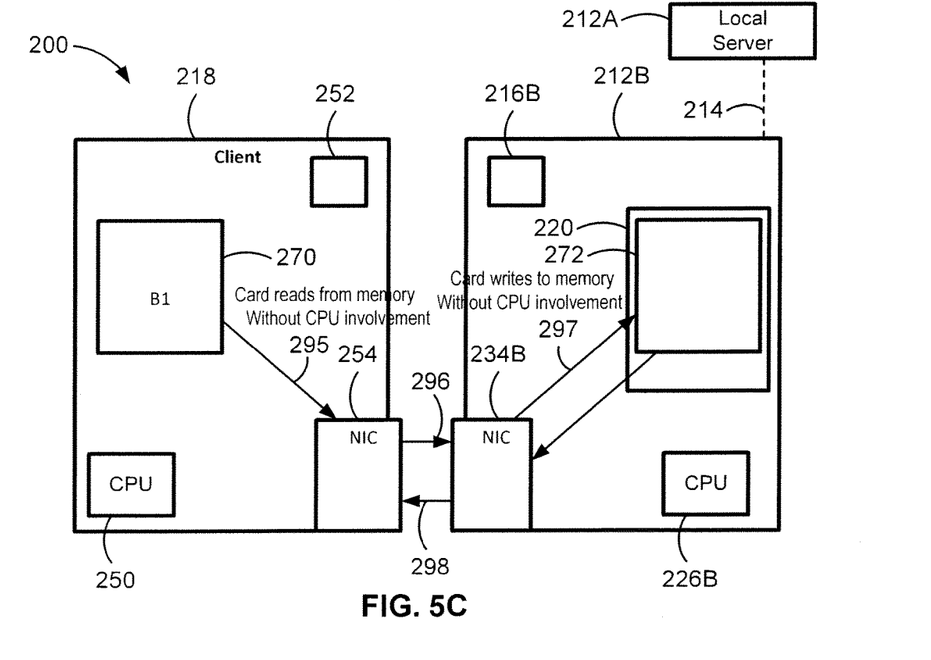

In FIG. 5A, the client 218 is initiating an RDMA write operation to transfer data/a data file 270, with a corresponding file name, file type and file path, stored in client's local memory 256 to an empty file buffer 272 in memory 220 of remote server node 212B (FIG. 5C). Similar to the example presented in FIG. 4A, to initiate the RDMA read operation, the client CPU 250 of client computing device 218 in FIG. 5A transmits, and server CPU's 226A and 22B of local and remote server nodes 212A and 22B, respectively, receive an OPEN CONNECTION request 290. Responsive to the received OPEN CONNECTION request 290 and a successful connection, the local and remote server CPU's 226A, 22B transmit, and the client CPU 250 of client computing device 218 receives, a connection OPEN SUCCESS indicator 291 to notify that the connection is complete. The foregoing connection can be created, for example, with an RDMA verbs layer as described above with respect to FIG. 4A.

Similar to the previous example, the client CPU 250 allocates an empty buffer 270, with a corresponding buffer address, within a memory region of the client computing device 218. After the client allocates said buffer, it is loaded with data, e.g., from a local storage disk. Similar to FIG. 4B, client CPU 250 is shown in FIG. 5B submitting to the client NIC 254 a REGISTER B2 292 registration request to register the buffer address and return a corresponding cookie. Client network interface card 254 responds in FIG. 5B by creating a steering tag for the allocated buffer and returning a REGISTRATION SUCCESS 293 with the requested steering tag STAG(B2). The client CPU can then direct the server NIC to use the steering tag to write data to the memory in question.

Client 218 uses the STAG received from the client NIC 254, for example, as data in an untagged buffer message to tell the servers 212A and 212B about the buffer STAG. In at least some embodiments, RDMA SMBD mandates that the client initiate transfer for the tagged buffer case and direct the host server to do a read to the buffer. For instance, once the requested steering tag is generated by the client NIC 254, client CPU 250 transmits an initiate RDMA operation request, represented in FIG. 5B as WRITE REQUEST 294, across network to local server CPU 226A of the local server node 212A and across cluster switching fabric 214 to remote server CPU 226B of the remote server node 212B (FIG. 5C). RDMA operation request 294 includes source (SRC) and destination (DEST) information and an RDMA operation—a write request—to be performed by the remote server node. In the illustrated example, the destination DEST is the buffer within system memory 220, whereas the source SRC is the STAG that corresponds to the buffer that the client allocated and registered with client NIC 254.

When the WRITE REQUEST 294 is received, remote server CPUB 226 pulls the buffer for the data, which may require reading and loading a buffer from disk, and registers this buffer with the remote server NIC 234B by placing a corresponding work request on its QP. Server 212B of FIG. 5C places another work request on its QP with the STAG for the buffer and the STAG from the client. The work request tells the remote server NIC to read the remote buffer to the local buffer. With reference to FIG. 5C, for example, client NIC 254 READS FROM MEMORY 295 the data file 270 without utilizing client CPU 250, and transmits the data file 238 from client NIC 254 to remote server NIC 234B, as indicated at 296. Server NIC 234B will then WRITE TO MEMORY 297 the data file to perform the requested RDMA operation without utilizing the remote server CPU 226B. Once the transfer is complete, the server NIC 234 tells the server side SMBD on CPU 226B that the requested RDMA operation is complete. Server SMBD creates a message indicating success, and directs network interface card 234B to send a completion message as an untagged buffer, as indicated at 298. Client receives this message indicating that the buffer corresponding to its STAG is now written to the server.

Figure 6:
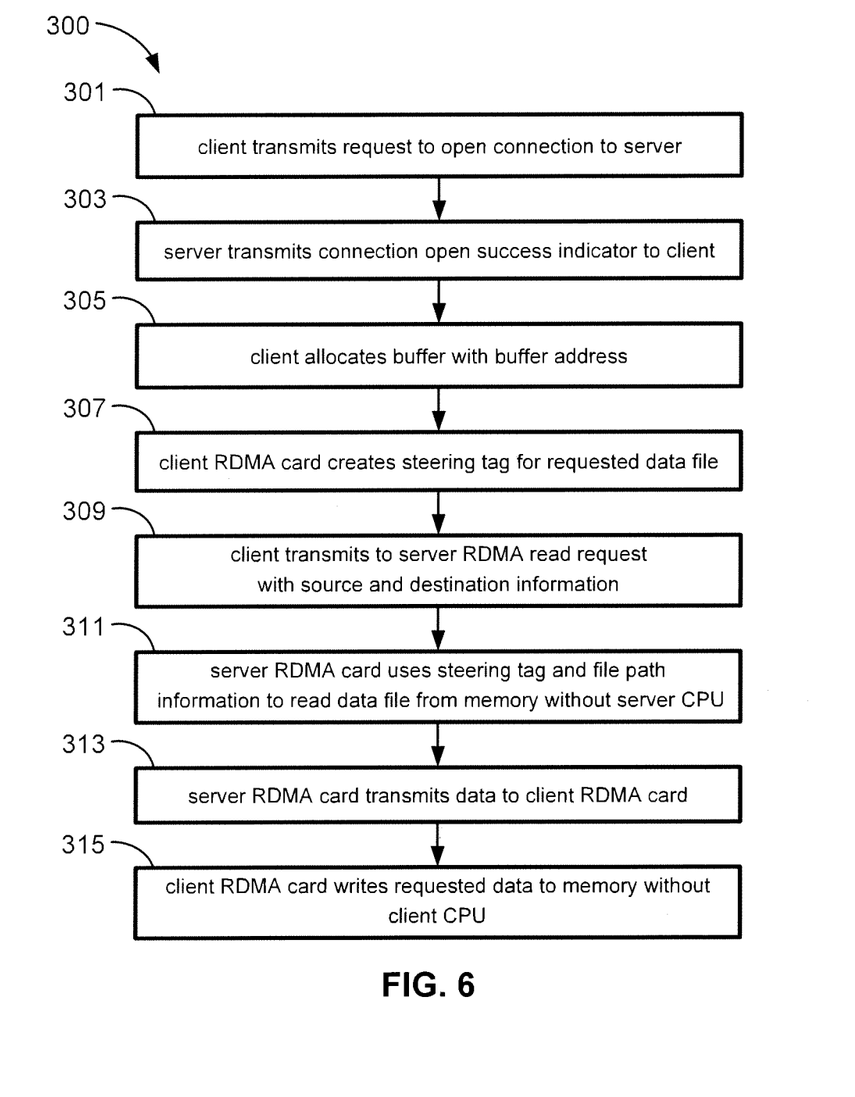
FIG. 6 is a flow chart illustrating a representative method or work flow process of an upper layer protocol (ULP) for Remote Direct Memory Access (RDMA) in accordance with aspects of the present disclosure.

Presented in FIG. 6 is a novel method or work flow process for performing upper layer protocol (ULP) for a Remote Direct Memory Access (RDMA) computer network. The method, which is generally designated as 300, begins at block 301 with the client transmitting a request to one or more or all server nodes in the cluster to open a connection. Each server responds, at block 303, with transmitting an indication that a connection has been successfully opened. The method 300 continues to block 305 where the client allocates a buffer with a corresponding buffer address, where data is either written to or read from said buffer. At block 307, the client CPU registers the allocated buffer with the client RNIC, which in turn responds by creating a steering tag for the registered buffer. Client CPU then transmits to local server CPU and, concomitantly, remote server CPU via fabric interconnect an RDMA read (or write) request at block 309, said request including requisite source and destination information. Remote server RNIC uses steering tag and file path information to read the requested data file from memory, at 311. Alternatively, for an RDMA write operation, remote server RNIC uses steering tag and file path information to write data to resident memory. At block 313, the remote server RNIC transmits data directly to the client RNIC over network interconnect, rather than hopping over the local node via fabric interconnect. Then, at block 315, the client RNIC writes the requested data to the allocated buffer. Method 300 can include any of the operations discussed hereinabove with respect to FIG. 3 FIGS. 4A-4C and/or FIGS. 5A-5C, singly, in any order, and in any combination.

The following exemplary options, features and configurations are not intended to represent each embodiment or every aspect of the present disclosure. The above features and advantages, and other features and advantages of the present disclosure, will become more readily apparent from the following examples. In this regard, each of the disclosed systems, methods, devices, protocols, etc., including those illustrated in the figures, may comprise any of the features, options, and alternatives described hereinabove and hereinbelow with respect to the other embodiments unless explicitly disclaimed or logically prohibited.

Aspects of the present disclosure are directed to methods for performing RDMA operations. As an example, a method is disclosed for performing upper layer protocol (ULP) for an RDMA computer network. The method includes, in any order and in combination with any of the optional features disclosed herein: allocating, by a client CPU of a client computing device connected to the RDMA computer network, a buffer with a buffer address in a memory region of the client computing device; creating, by a client NIC of the client computing device, a steering tag for the allocated buffer; transmitting, by the client CPU to a local server CPU of a local server node of the RDMA computer network, an initiate RDMA operation request regarding a data file on a remote server node, the RDMA operation request including source and destination (SRC-DEST) information and an RDMA operation to be performed by the remote server node, the SRC-DEST information including the steering tag and a file path for the data file; locating, by a remote server NIC of the remote server node without utilizing a remote server CPU, the data file based on the file path; performing, by the remote server NIC without utilizing the remote server CPU, the RDMA operation requested by the client computing device; and, completing the requested RDMA operation by the client NIC and remote server NIC without utilizing the client CPU or the remote server CPU.

The methods disclosed herein may further comprise: receiving, by the local server node from the client computing device, an open connection request; and transmitting, by the local server node to the client computing device, a connection open success indicator. For any of the disclosed methods, the open connection request can be transmitted by the client CPU and received by the local server CPU, while the open success indicator can be transmitted by the local server CPU and received by the client CPU. Any of the disclosed methods may further comprise, singly or in any combination: creating a connection between the client computing device and the remote server, wherein the connection is created with an RDMA verbs layer, the RDMA verbs layer using a protection domain (PD) to associate the memory region for the buffer of the client computing device to one or more queue pairs (QP); transmitting, by the client CPU to the client NIC prior to the creating the steering tag, a register request for a cookie; and/or storing, by the remote server node in a remote server memory device, the data file associated with a corresponding file name and the file path. Any of the disclosed methods may further comprise transmitting, by the remote server NIC to the client CPU in response to completing the requested RDMA operation, a completion success message as an untagged buffer.

The methods disclosed herein may further comprise: allocating, by the remote server CPU in a remote server memory device, a holding buffer for the data file; and registering, by the remote server CPU with the remote server NIC, the holding buffer. For any of the disclosed methods, the SRC-DEST information may also include a file name and a file type for the data file of the remote server node. For any of the disclosed methods, the steering tag created by the client NIC and transmitted to the remote server NIC can contain information relating to a location of the data file in a data storage module of the remote server node. For any of the disclosed methods, the RDMA operation to be performed by the remote server node is an RDMA read operation, which may comprise: reading, by the remote server NIC from a data storage module of the remote server node without utilizing the remote server CPU, the data file; transmitting, by the remote server NIC to the client NIC, the data file; and writing, by the client NIC without utilizing the client CPU of the client computing device, the data file to the allocated buffer. For any of the disclosed methods, the RDMA operation to be performed by the remote server node is an RDMA write operation, which may comprise: reading, by the client NIC from the allocated buffer in the memory region of the client computing device without utilizing the client CPU, data for the data file; transmitting, by the client NIC to the remote server NIC, the data for the data file; and writing, by the remote server NIC without utilizing the remote server CPU, the data to the data file on a data storage module of the remote server node.

Other aspects of the present disclosure are directed to non-transitory machine-readable media having stored thereon instructions for performing methods comprising machine executable code. As an example, the machine readable code, when executed by a client machine, a local server machine and a remote server machine, causes the machines to perform the following operations, in any order and in combination with any of the optional features disclosed above: allocate, by a client CPU of the client machine, a buffer with a buffer address in a memory region of the client machine; create, by a client NIC of the client machine, a steering tag for the allocated buffer; transmit, by the client CPU to a local server CPU of the local server machine, an initiate RDMA operation request regarding a data file, the RDMA operation request including source and destination (SRC-DEST) information and an RDMA operation to be performed by the remote server machine, the SRC-DEST information including the steering tag and a file path for the data file; locate, by a remote server NIC of the remote server machine without utilizing a remote server CPU, the data file based on the file path; perform, by the remote server NIC without utilizing the remote server CPU, the RDMA operation requested by the client computing device; and complete the requested RDMA operation by the client and remote server NW's without utilizing the client or remote server CPU's.

According to other aspects of the presented disclosure, mass data storage systems, networks and configurations are disclosed. As an example, an RDMA computer network is disclosed. The RDMA computer network includes a local server node, which includes a local server CPU, a local server NIC, and a local data storage module, as well as a remote server node, which includes a remote server CPU, a remote server NIC, and a remote data storage module. The RDMA computer network also includes a client computing device that is communicatively coupled to the server nodes and includes a client central processing unit (CPU), a client network interface card (NIC), and a memory device. The client CPU of the client computing device is operable to allocate a buffer with a buffer address in a memory region of the client computing device. The client NIC of the client computing device is operable to create a steering tag for the allocated buffer. The client CPU is operable to transmit to the server CPU an initiate RDMA operation request regarding a data file. The RDMA operation request includes, for example, source and destination (SRC-DEST) information and an RDMA operation to be performed by the remote server node. The SRC-DEST information includes, for example, the steering tag and a file path for the data file. The remote server NIC is operable to locate the data file based on the file path without utilizing the remote server CPU. The remote server NIC is operable to perform the RDMA operation requested by the client computing device without utilizing the remote server CPU. The client NIC and remote server NIC are operable to complete the requested RDMA operation by without utilizing the client, local server node or remote server node CPU's.

The present disclosure is not limited to the precise construction and compositions disclosed herein; any and all modifications, changes, and variations apparent from the foregoing descriptions are within the scope of the disclosure as defined in the appended claims. Moreover, the present concepts expressly include any and all combinations and subcombinations of the preceding elements and aspects.

What is claimed:

1. A method, comprising:
receiving a remote direct memory access RDMA request by a remote node, from a local node, via an interconnect connecting the local node and the remote node; wherein the request is generated by a client device for a data file stored by the remote node, the request including a path for the data file, and source and destination information with a steering tag created by a client network interface card (NIC); wherein the client device is connected by a network connection to the local node and the remote node; and
performing an RDMA operation for the data file by a remote node NIC of the remote node, without using a remote CPU, and without routing the data file using the interconnect;
wherein for a read request, the remote node NIC retrieves requested data from a remote node memory and provides the requested directly to the client NIC without using the local node and the remote CPU, and for a write request, data for the data file is received by the remote NIC directly from the client NIC, and written to the remote node memory without using the local node and the remote CPU.

2. The method of claim 1, further comprising:
receiving an open connection request by the local node from the client device; and
transmitting a connection open success indicator by the local node to the client device.

3. The method of claim 1, further comprising:
creating a connection between the client device and the remote node, using an RDMA verbs layer, the RDMA verbs layer using a protection domain (PD) to associate a memory region of a buffer of the client device to one or more queue pairs (QP).

4. The method of claim 1, further comprising:
allocating a holding buffer for the data file, by the remote node CPU in the remote memory; and
registering the holding buffer by the remote node CPU, with the remote node NIC.

5. The method of claim 1, wherein the steering tag transmitted to the remote node NIC includes information relating to a location of the data file in a data storage module of the remote node.

6. The method of claim 1, for the read request, further comprising:
reading the data file by the remote node NIC, from a data storage module of the remote node, without utilizing the remote CPU; and
transmitting the data file, by the remote node NIC directly to the client NIC.

7. The method of claim 1, for the write request, further comprising:
receiving the data for the data file, by the remote node NIC from the client NIC; and
writing the data for the data file, by the remote node NIC without utilizing the remote CPU, to a data storage module of the remote node.

8. A non-transitory machine readable medium having stored thereon instructions for performing a method comprising machine executable code which, when executed by at least one machine, causes the machines to:
receive a remote direct memory access RDMA request by a remote node, from a local node, via an interconnect connecting the local node and the remote node; wherein the request is generated by a client device for a data file stored by the remote nod, the request including a path for the data file, and source and destination information with a steering tag created by a client network interface card (NIC); wherein the client device is connected by a network connection to the local node and the remote node; and
perform an RDMA operation for the data file by a remote node NIC of the remote node, without using a remote CPU, and without routing the data file using the interconnect;
wherein for a read request, the remote node NIC retrieves requested data from a remote node memory and provides the requested directly to the client NIC without using the local node and the remote CPU, and for a write request, data for the data file is received by the remote NIC directly from the client NIC, and written to the remote node memory without using the local node and the remote CPU.

9. The non-transitory machine readable medium of claim 8, wherein the stored instructions further cause the machines to:
receive an open connection request by the local node from the client device; and
transmit a connection open success indicator by the local node to the client device.

10. The non-transitory machine readable medium of claim 8, wherein the stored instructions further cause the machines to:
create a connection between the client device and the remote node, using an RDMA verbs layer, the RDMA verbs layer using a protection domain (PD) to associate a memory region of a buffer of the client device to one or more queue pairs (QP).

11. The non-transitory machine readable medium of claim 8, wherein the stored instructions further cause the machines to:
allocate a holding buffer for the data file, by the remote node CPU in the remote memory; and
register the holding buffer by the remote node CPU, with the remote node NIC.

12. The non-transitory machine readable medium of claim 8, wherein the steering tag transmitted to the remote node NIC includes information relating to a location of the data file in a data storage module of the remote node.

13. The non-transitory machine readable medium of claim 8, wherein the stored instructions for the read request, further cause the machines to:
read the data file by the remote node NIC, from a data storage module of the remote node, without utilizing the remote CPU; and
transmit the data file, by the remote node NIC directly to the client NIC.

14. The non-transitory machine readable medium of claim 8, wherein the stored instructions for the write request, further cause the machines to:
receive the data for the data file, by the remote node NIC from the client NIC; and
write the data for the data file, by the remote node NIC without utilizing the remote CPU, to a data storage module of the remote node.

15. A system comprising:
a memory containing machine readable medium comprising machine executable code having stored thereon instructions; and a processor configured to execute the machine executable code to:
receive a remote direct memory access RDMA request by a remote node, from a local node, via an interconnect connecting the local node and the remote node; wherein the request is generated by a client device for a data file stored by the remote node, the request including a path for the data file, and source and destination information with a steering tag created by a client network interface card (NIC); wherein the client device is connected by a network connection to the local node and the remote node; and perform an RDMA operation for the data file by a remote node NIC of the remote node, without using a remote CPU, and without routing the data file using the interconnect;

wherein for a read request, the remote node NIC retrieves requested data from a remote node memory and provides the requested directly to the client NIC without using the local node and the remote CPU, and for a write request, data for the data file is received by the remote NIC directly from the client NIC, and written to the remote node memory without using the local node and the remote CPU.

16. The system of claim 15, wherein the stored instructions further cause the executable code to:
receive an open connection request by the local node from the client device; and
transmit a connection open success indicator by the local node to the client device.

17. The system of claim 15, wherein the stored instructions further causes the executable code to:
create a connection between the client device and the remote node, using an RDMA verbs layer, the RDMA verbs layer using a protection domain (PD) to associate a memory region of a buffer of the client device to one or more queue pairs (QP).

18. The system of claim 15, wherein the stored instructions further causes the executable code to:
allocate a holding buffer for the data file, by the remote node CPU in the remote memory; and
register the holding buffer by the remote node CPU, with the remote node NIC.

19. The system of claim 15, wherein the steering tag transmitted to the remote node NIC includes information relating to a location of the data file in a data storage module of the remote node.

20. The system of claim 15, wherein the stored instructions, for the read request, further causes the executable code to:
read the data file by the remote node NIC, from a data storage module of the remote node, without utilizing the remote CPU; and
transmit the data file, by the remote node NIC directly to the client NIC.

* * * * *